United States Patent Office  3,663,562
Patented May 16, 1972

3,663,562
PROCESS FOR THE PRODUCTION OF
2-MERCAPTO-BENZOTHIAZOLE
Helmut Magerlein and Hans-Dieter Rupp, Erlenbach, and
Gerhard Meyer, Obernburg, Germany, assignors to
Glanzstoff AG, Wuppertal, Germany
No Drawing. Filed Apr. 10, 1970, Ser. No. 27,418
Claims priority, application Germany, Apr. 17, 1969,
P 19 19 420.8
Int. Cl. C07d 91/48
U.S. Cl. 260—306      5 Claims

ABSTRACT OF THE DISCLOSURE

Process for the production of 2-mercapto-benzothiazole by reacting aniline and elementary sulfur with trithiane at an elevated temperature and preferably under superatmospheric pressure. The product is obtained in good yields and purity and is known to be useful as a vulcanization accelerator.

It is known that 2-mercapto-benzothiazole can be obtained by reacting o-nitrochlorobenzene with an aqueous solution of sodium hydrosulfide and then further subjecting the resulting reaction mixture to a reaction with carbon disulfide. This process is time-consuming and troublesome, and it is furthermore necessary to separate the desired product from the remaining constituents of the reaction mixture in several process steps. Also, it is not particularly desirable to employ a compound such as o-nitrochlorobenzene as an initial reactant, since this compound contains chlorine which must first be introduced into the aromatic nucleus in a special preliminary step and which must then be removed or separated in the course of the reaction steps used in producing 2-mercaptobenzothiazole. Accordingly, this known method must be considered unsatisfactory from a commercial viewpoint.

Another known process for the production of 2-mercaptobenzothiazole involves the reaction of aniline with carbon disulfide and sulfur at superatmospheric pressures and elevated temperatures. However, the resulting reaction product is highly contaminated with tarry by-products so that after completion of the reaction, it becomes necessary to carry out a whole series of process steps in order to obtain a pure product.

Moreover, it is extremely dangerous to work with carbon disulfide because this compound is very flammable. Vapors of carbon disulfide with air will ignite at temperatures as low as 100° C. A mixture of air/$CS_2$ containing only 2 to 50% $CS_2$ is quite explosive. For these reasons, it is absolutely necessary to take a number of precautionary measures when working with carbon disulfide. Thus, in order to avoid explosions when reacting aniline with carbon disulfide and sulfur, the process and its apparatus become quite expensive and complicated.

One object of the present invention is to provide a new and commercially more attractive process for the production of 2-mercapto-benzothiazole. Another object of the invention is to provide a process which is relatively inexpensive and easy to carry out with readily available initial materials, while producing 2-mercapto-benzothiazole in relatively high yields and purity. These and other objects and advantages of the invention will become more apparent upon consideration of the following detailed disclosure.

It has now been found, in accordance with the present invention, that 2-mercapto-benzothiazole can be produced in an especially advantageous manner by reacting aniline and sulfur with trithiane at an elevated temperature, e.g. about 180° C. to 260° C., preferably from about 210° C.

aldehyde. The trithiane precipitates in solid form and can to 260° C. It is also preferable to carry out the reaction under a superatmospheric pressure.

The reaction according to the invention can be represented by the following equation:

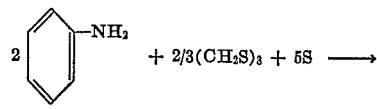

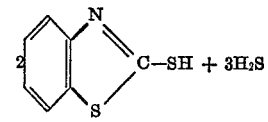

In carrying out the reaction according to the invention, the initial reactants can be brought together as a mixture in a suitable reaction vessel which is equipped with conventional control devices, e.g. for the measurement of pressure and temperature. The reactor is preferably constructed in such a manner that the uncontrolled escape of hydrogen sulfide can be avoided. When the reaction is carried out as a batch process, it is preferable to employ a closed vessel such as an autoclave. However, tubular reactors are quite suitable for a continuous operation. As explained more fully below, no special precautions are required to avoid explosions so that the apparatus used is quite inexpensive.

The initial reactants of aniline:sulfur:trithiane are preferably brought together in the reaction in approximately stoichiometric amounts, i.e. in a molar ratio of 6:15:2. The reaction can be conveniently carried out without any catalysts or additives other than the required initial reactants. In this respect, the process of the invention avoids those problems which arise when using other additives, i.e. the cost of such additives and the necessity of removing them from the reaction mixture.

The reaction time in a batch process or the retention time of the components in a continuous process is dependent upon the individual reaction conditions such as temperature and pressure. For example, at 240° C. and a pressure of 40-70 atmospheres, the most favorable reaction time is about three hours. In general, the reaction time lies between about one to five hours. Substantially longer reaction periods are considered to be undesirable since an over-extended reaction time leads to side-reactions which cause a corresponding loss in yield.

No special requirements are placed upon the purity of the initial reactant materials. Thus, all three initial reactants can be employed as technical grade materials which are readily available at low cost. Both aniline and sulfur are readily available from many sources, and it is preferable to introduce the elementary sulfur into the reaction in finely divided or finely dispersed form for admixture with the other reactants.

The reactant trithiane is a cyclic thioether having the structural formula

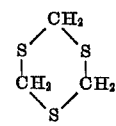

Trithiane in itself is a slow-reacting substance and has seldom been used in any chemical reactions. It is obtained in relatively large quantities as a waste product in the production of viscose filaments. In the well-known production of cellulosic filaments from viscose, spinning baths are employed which contain formaldehyde in addition to the usual additives. During the spinning process, trithiane is formed in the bath as the trimer of thioformbe easily filtered off from the bath. While the viscose process represents a major source for trithiane, it will be understood that other sources are also available.

It is possible to carry out the process of the invention at atmospheric pressure, but the speed of the reaction is then substantially slower. For this reason, it is preferable to work under a superatmospheric pressure and pressures of 30–200 atmospheres are especially advantageous. Likewise, the best results are obtained in a temperature range of about 210–260° C.

Upon completion of the reaction in accordance with the process of the invention, the reaction mixture can be easily worked up by methods which are conventional for a skilled chemist. For example, mercapto-benzothiazole by reason of its good solubility in an alkaline solution can be easily separated from impurities, and it can then be separated from its salt solution as a difficultly soluble precipitate by the addition of acid.

The production of 2-mercapto-benzothiazole by the process of the invention represents a substantial advance in this art. In place of the previous use of carbon disulfide as one reactant, it has been surprisingly found that trithiane can be used. This is a great advantage in comparison to the addition of a highly flammable and explosive compound such as carbon disulfide, particularly because both the process steps and the construction of the apparatus are considerably simplified. Thus, special precautionary measures can be eliminated, i.e. there is no necessity to use expensive shielding devices or other means for the protection of the primary reaction equipment or the room in which such equipment is located. Moreover, the reaction is more easily controlled and requires less supervision. In addition, the process of the invention is readily adapted to a continuous operation, e.g. using conventional pressurizing means for the operation of a tubular reactor. Finally, the process of the invention offers a new use for trithiane, previously considered as a worthless by-product, as an intermediate for the production of a very valuable compound.

The working up of the reaction mixture obtained in the process of the invention is quite simple. By treatment with an alkaline material, e.g. sodium carbonate or the like, the 2-mercapto-benzothiazole goes into solution and can be easily separated by filtration from the major portion of the impurities in the reaction mixture. By acidifying the filtrate, preferably in stages, it is possible to further separate any remaining impurities as a precipitate before the 2-mercapto-benzothiazole itself is precipitated. The finally purified product is obtained in good yields.

In addition to its use as a vulcanization accelerator, 2-mercapto-benzothiazole is also known to be useful as an intermediate for the production of pesticides or insecticides. These and other uses of the product will be readily apparent to those skilled in this art.

The invention is further illustrated by the following examples.

EXAMPLE 1

A mixture of 18.6 grams of aniline, 9.3 grams of trithiane and 16 grams of sulfur are maintained in a 100 ml. laboratory autoclave for a period of three hours at 240° C. After one hour of the reaction, the pressure in the autoclave amounts to 51 atmospheres. After completion of the reaction and cooling the autoclave, the hydrogen sulfide ($H_2S$) resulting from the reaction is carefully degassed. The semi-solid, brownish reaction mixture is then stirred with a dilute soda solution heated to 60–80° C. for a period of 15 minutes. The resulting yellow solution is cooled to 20° C. and separated by filtration from slight amounts of insoluble substances. The solution is then carefully acidified with an aqueous hydrochloric acid solution having a concentration of 10% HCl for the deposition or precipitation of small amounts of a tarry by-product which is then separated. A further addition of acid yields a yellow precipitate of 2-mercapto-benzothiazole, which can be filtered off and dried. The yield amounts to 26 grams (83.8% of theory). After recrystallization from ethanol, the melting point of the compound is 153–154° C.

EXAMPLE 2

A mixture of 18.6 grams of aniline, 9.3 grams of trithiane and 16 grams of sulfur are boiled in a 50 ml. glass flask at 184° C. under reflux. The progress of the reaction can be followed by means of the escaping hydrogen sulfide ($H_2S$). After five hours, the reaction is terminated. After working up the reaction mixture in the same manner as set forth in Example 1, there is obtained a yield of 7 grams of 2-mercapto-benzothiazole (22.6% of theory).

The invention is hereby claimed as follows:

1. A process for the production of 2-mercaptobenzothiazole which comprises reacting aniline and sulfur in admixture with trithiane at an elevated temperature of about 180° C. to 260° C.

2. A process as claimed in claim 1 wherein said reaction is carried out under a pressure of about 30 to 200 atmospheres.

3. A process as claimed in claim 1 wherein said reaction is carried out at a temperature of about 180° C. to 260° C. and under a pressure of about 30 to 200 atmospheres.

4. A process as claimed in claim 3 wherein said reaction is carried out at a temperature of about 210° C. to 260° C.

5. A process as claimed in claim 3 wherein said aniline, sulfur and trithiane are reacted in an approximately stoichiometric ratio of 6:15:2.

References Cited

UNITED STATES PATENTS 3,544,592  12/1970  Rupp et al. _____ 260—327 T

ALEX MAZEL, Primary Examiner

R. J. GALLAGHER, Assistant Examiner

PO-1050
(5/69)

UNITED STATES PATENT OFFICE
CERTIFICATE OF CORRECTION

Patent No. 3,663,562        Dated May 16, 1972

Inventor(s) Helmut Magerlein, Hans-Dieter Rupp, and Gerhard Meyer

It is certified that error appears in the above-identified patent and that said Letters Patent are hereby corrected as shown below:

Column 2, line 1, delete "aldehyde. The trithiane precipitates in solid form and can".

Column 3, before line 1, insert -- aldehyde. The trithiane precipitates in solid form and can --.

Signed and sealed this 29th day of August 1972.

(SEAL)
Attest:

EDWARD M. FLETCHER, JR.
Attesting Officer

ROBERT GOTTSCHALK
Commissioner of Patents